(12) United States Patent
Martineau et al.

(10) Patent No.: US 8,597,009 B2
(45) Date of Patent: Dec. 3, 2013

(54) FILM INSERT MOLDING (FIM) ON A 3D SHAPE

(75) Inventors: Patrick Martineau, Ile-Perrot (CA); Eden Dubuc, Saint-Michel (CA); Christopher L. Bohler, North Royalton, OH (US)

(73) Assignee: GE Lighting Solutions LLC, Cleveland, OH (US)

( * ) Notice: Subject to any disclaimer, the term of this patent is extended or adjusted under 35 U.S.C. 154(b) by 574 days.

(21) Appl. No.: 12/107,336

(22) Filed: Apr. 22, 2008

(65) Prior Publication Data

US 2009/0261490 A1    Oct. 22, 2009

(51) Int. Cl.
*B29C 45/14*      (2006.01)
*B29C 45/26*      (2006.01)

(52) U.S. Cl.
USPC ........ 425/112; 425/127; 425/129.1; 264/266; 264/267; 264/275

(58) Field of Classification Search
None
See application file for complete search history.

(56) References Cited

U.S. PATENT DOCUMENTS

| | | | | |
|---|---|---|---|---|
| 5,048,317 A | * | 9/1991 | Hirota et al. | 72/347 |
| 5,286,419 A | * | 2/1994 | van Ligten et al. | 264/1.32 |
| 5,800,744 A | * | 9/1998 | Munakata | 264/1.7 |
| 5,827,614 A | * | 10/1998 | Bhalakia et al. | 428/411.1 |
| 5,851,560 A | * | 12/1998 | Kobayashi et al. | 425/121 |
| 5,945,059 A | * | 8/1999 | Atake | 264/510 |
| 6,071,456 A | * | 6/2000 | Hanamoto et al. | 264/265 |
| 6,165,392 A | * | 12/2000 | Kobuchi et al. | 264/1.7 |
| 6,251,333 B1 | * | 6/2001 | Zheng et al. | 264/513 |
| 6,807,006 B2 | * | 10/2004 | Nakagoshi | 359/487.02 |
| 7,025,458 B2 | * | 4/2006 | Vu | 351/177 |
| 7,641,845 B2 | * | 1/2010 | Chang | 264/511 |
| 7,655,178 B2 | * | 2/2010 | Chang | 264/547 |
| 2007/0102110 A1 | * | 5/2007 | Yuba et al. | 156/285 |
| 2009/0017322 A1 | * | 1/2009 | Hayes et al. | 428/515 |

\* cited by examiner

*Primary Examiner* — Edmund H. Lee
(74) *Attorney, Agent, or Firm* — Fay Sharpe LLP

(57) ABSTRACT

Systems and methods are described for performing film insert molding (FIM) on a 3D shape, such as a traffic light shell or cover. A film is pre-generated for a surface to be covered by the film, and is inserted into a mold. A viscous material is then injected into the mold and the film bonds to the shell as the viscous material cools and hardens. The film includes a material selected to provide one or more of scratch resistance, improved shell hardness, UV protection, corrosion protection etc., and/or may be selected to alter optical characteristics of the shell.

16 Claims, 3 Drawing Sheets

FILM INSERT MOLDING (FIM) ON A 3D SHAPE

BACKGROUND

The subject innovation relates to film insert molding (FIM). It finds particular application in conjunction with film insert molding on a three-dimensional (3D) shape, and will be described with particular reference thereto. However, it is to be appreciated that the described embodiments are also amenable to other applications.

Options for generating a hard-coated surface (dipping, powder coating, FIM, etc.) require capital investment (paint shop set-up: ventilation, dust control, etc.). Of these, FIM is often the least expensive. Conventional FIM is a 3 steps process. First, the graphics are printed or coated on special high temperature films. Special inks are used that have been designed to endure the injection-molding environment. Next, the printed or coated appliqué can be formed into a 3D shape and cut to size for placement in the mold. Finally, the appliqué is placed in a mold cavity in which plastic is injected and the appliqué becomes integrated with the new plastic part. At this point, the part is completely coated or decorated and final assembly may take place.

Testing of existing film insert molds has revealed two major problems. First, when molding a shell that has a spherical surface, over-molding the film without folds on the outer portion is not possible using conventional systems and/or methods. Second, the injection point is usually in the mold's cavity, impeding the ability to over-mold the film on the outer side of the shell. Moreover, pre-shaping the film before over-molding it is not cost effective because it requires testing on different shapes in order to establish the minimum radius for the spherical surface and the maximum film thickness required.

Accordingly, there is a need in the art for systems and/or methods that overcome the aforementioned deficiencies and others.

BRIEF DESCRIPTION

According to one aspect, a film insert molding (FIM) system comprises a film insert for protecting an article, and a mold having the shape of the article to be protected, with a ratio of radius of curvature to diameter that is within a pre-defined range of ratios to prevent wrinkling of the film insert, into which the film is placed. The system further comprises an injection molding component that injects viscous material into the mold to form the article, to which the film adheres as the viscous material cools.

According to another aspect, a method of film insert molding of an article comprises generating a film insert, inserting the film insert into a mold, and injecting a viscous material into the mold, wherein the film couples to the material as the material cools and hardens. The ratio of a radius of curvature to diameter of the surface of the mold into which the film insert is placed is between approximately 1.5:1 and 10:1 to prevent the film insert from wrinkling.

According to another aspect, a film insert molding (FIM) system, comprises a flexible planar film having a shape that is congruent to a surface of an translucent traffic light shell, and a mold having the shape of the traffic light shell, into which the film is placed and viscous material is injected to form the traffic light shell, to which the film adheres as the viscous material cools. The surface of the mold has a ratio of a radius of curvature to diameter of an interior surface of the mold is within a predefined range of ratios to prevent wrinkling of the insert film, and the film provides protection from ultraviolet light and increases shell surface hardness.

BRIEF DESCRIPTION OF THE DRAWINGS

FIG. 1 a pre-cut, non-planar film insert is shown, which is three-dimensional (3D) in shape to fit a mold into which a plastic material is injected to form, for instance, a traffic light shell or the like;

DETAILED DESCRIPTION

When manufacturing traffic light lenses or shells, a hard-coated shell surface is desirable for scratch resistance and to protect the shell plastic or polymer from degradation due to ultraviolet (UV) light. As the cost of the traffic light decreases, the cost of hard coating becomes significant. For instance, the cost of hard coating on an 8-inch traffic light shell may be approximately 10% of the total cost of the light. To reduce this cost, systems and methods are described for over-molding a thin film to generate a hard-coated surface on a spherical shape. While traditional methods involve two suppliers, such as a molder (e.g., a one-day process) and a coater (e.g., a 2-3 weeks' process), the subject innovation involves only a molding process, thereby reducing the cost associated with hard-coating by approximately 50% or more.

Figure 1:
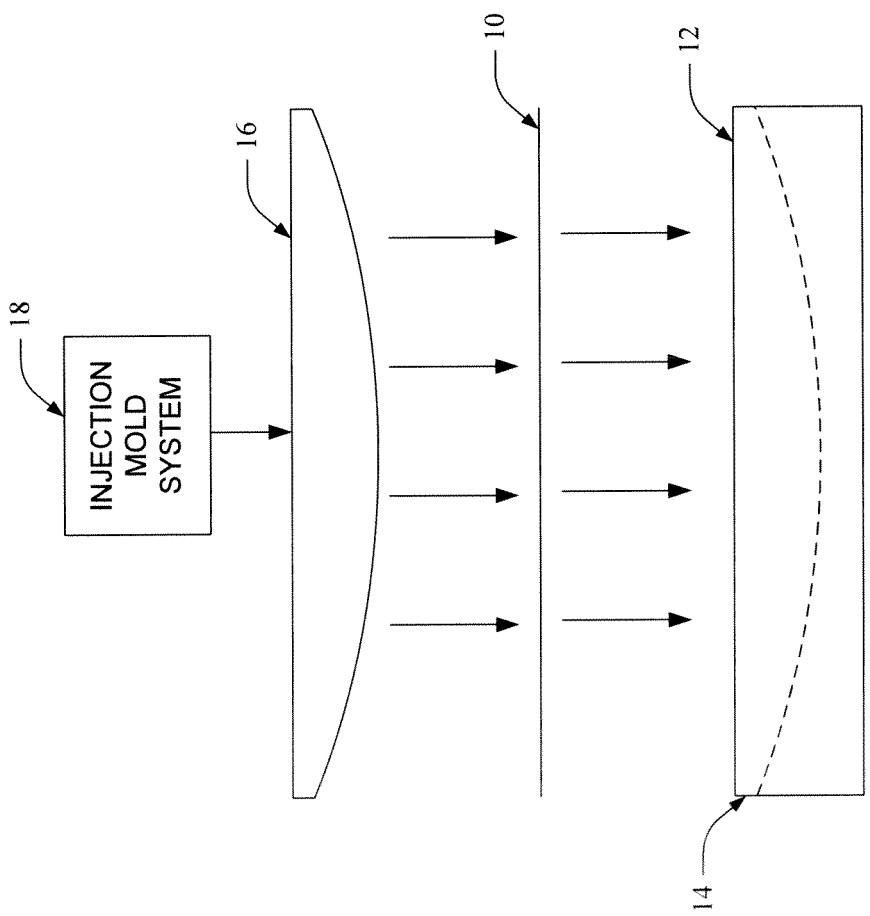

With reference to FIG. 1, a pre-cut, non-planar film insert 10 is shown, which is planar or three-dimensional (3D) in shape to fit a mold 12 into which a plastic material is injected to form, for instance, a traffic light cover shell or the like. In one embodiment, the film insert 10 is flexible and planar, and need not be pre-shaped, which reduces cost. The film may be on the order of a few microns to several millimeters in thickness. The film 10 is die cut and placed directly into the mold 12. Thus, a hard coating is applied that is less expensive than conventional dipping process or standard FIM, and reduces process time (e.g., from 15 days to 1 day), which in turn reduces inventory. Other benefits can include scratch resistance, light transmission variability, reflection reduction on the coated surface (e.g., by more than 70% if desired), and increased UV stability, depending on the film material. A pre-cut non-planar 3D film insert also mitigates undesirable "wrinkle" that can occur when trying to adapt a flat film to a 3D shape. However, wrinkle can be mitigated for a planar insert by maintaining a prescribed range of ratios of radius of curvature to diameter for the article surface to which the insert is coupled.

The film 10 can also be employed as a mask, printed on one side, employed as a diffuser, a reflector, or a combination of the foregoing. For example, the film may be employed as a mask on an outer shell of an LED traffic signal, such as to generate an arrow pattern or the like.

When the film insert 10 is a planar insert, wrinkle can be mitigated by controlling the ratio of the radius of curvature-to-diameter to which the planar film is adapted when placed in the mold. In one embodiment, the ratio of the radius of curvature of the surface of the film to the diameter of the film is at least approximately 1:1 and at most approximately 10:1. Radius of curvature, as used herein, denotes a radius of a sphere having a curvature equal to the curvature of the surface of a curved article being formed with the subject film insert(s) For example, a radius of curvature for an 8-inch diameter traffic signal lamp shell may be approximately 48 inches, for a ratio of 6:1. That is, a lamp shell that has a diameter of 8 inches, if extended outward along it's radius of curvature, would form a sphere having a radius of 48 inches. In another example, a 12-inch diameter traffic signal lamp shell may have a radius of curvature of approximately 20 inches, for a ratio of 1.67:1. By maintaining the radius of curvature within such limits, a planar film can be overmolded onto a 3D surface without wrinkle, thereby reducing costs while achieving a desired level of quality. It will be appreciated that other lamp shell diameters and radii of curvature are possible, and that the foregoing are provided for illustrative purposes and not intended to limit the scope of the subject description or the claims appended hereto.

It is to be appreciated that the traffic light shell and/or semi-spherical shape described herein is presented for illustrative purposes only, and that the innovation is not limited to such applications and or shapes. Rather, any desired shape that is amenable to molding can be coated with the film described herein. For instance, the shape of the mold may have straight edges (e.g., triangular, columnar, cubic, polyhedron, etc.) curved edges, or a combination thereof.

With continued reference to FIG. 1, the concave mold 12 for a traffic light shell or the like is illustrated with side portions 14. The film 10 is die-cut to fit the interior surface of the mold 12, and can be placed therein prior to an injection molding procedure. The side portions 14 of the shell can comprise a coupling means (not shown) (e.g., threaded or screw-type coupling, retaining tabs, etc.) that couples to a complementary means on housing (e.g., a traffic light housing or the like). In another embodiment, the shell is retained in the housing by a retaining ring (e.g., silicon or a suitable elastic polymer).

Once the film is placed in the mold, a cap portion 16 is optionally applied to the mold to form a cavity into which an injection molding system 18 injects a polymer or other material to form the article. By injecting material through the cap portion 16, the film insert is maintained on the desired surface of the article, once formed.

Figure 2:
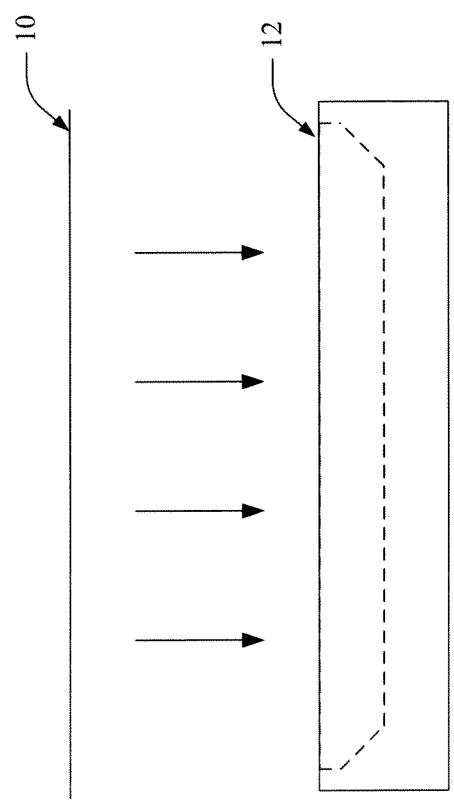
FIG. 2 illustrates another embodiment of the film insert molding system, in which the die-cut film insert is not spherical, but rather has a predefined shape comprising a plurality of edges.

FIG. 2 illustrates another embodiment of the film insert molding system, in which the mold 12 is not spherical, but rather has a predefined shape comprising a plurality of edges. A planar or 3D film insert can be used when injection-molding parts to provide scratch resistance, UV protection, salt or chemical protection, etc. In other embodiments, the film comprises a material that provides a polarization or filtering effect, color or neutral density filtering, etc.

In still other embodiments, the film insert 10 is patterned to act as a mask. For instance, the film insert may be opaque and/or reflective except for a desired pattern, such as an arrow, and a translucent traffic light shell can be molded once the film insert is placed in the mold, thereby producing a shell with a substantially opaque surface but which emits light in an arrow-shaped pattern.

Figure 3:
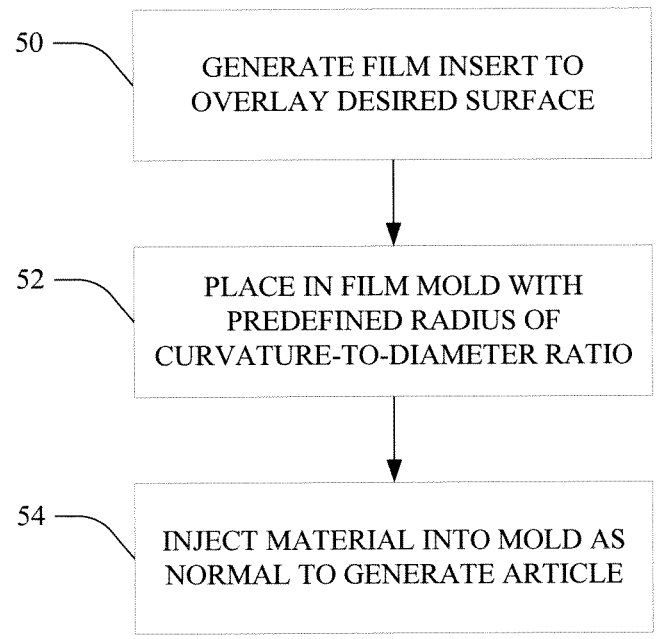
FIG. 3 illustrates a method for employing a non-planar pre-cut film insert to attach the film insert to a molded article, in accordance with various aspects set forth herein.

FIG. 3 illustrates a method for employing a planar or non-planar pre-cut film insert to attach the film insert to a molded article, in accordance with various aspects set forth herein. At 50, a planar film insert is pre-generated (e.g., die-cut or the like) to cover a surface of an article to be molded. In one embodiment, the article is a translucent lens or shell for a traffic light. In another embodiment, the article is a lens or shell for an automobile (e.g., a headlight, taillight, interior light, clearance light, running board light, or other automobile light). In yet another embodiment, the article is any part or component for which a film insert molding procedure is desirable to provide additional surface protection (e.g., hardness, corrosion resistance, UV resistance, etc.).

At 52, the film insert is placed in the mold. At 54, material is introduced into the mold using an injection molding technique, causing the film insert to adhere to the material as it cools, thereby forming the article with the film coupled to a desired surface thereof.

It will be appreciated that although the subject innovation has been described herein with regard protective films for injection-molded light covers for traffic lights, the prefabricated planar or 3D film inserts may be employed in any suitable molding procedure wherein it is desired to affix a film to a molded article. For instance, it may be desirable to apply such protective films to lenses, reflectors, auto parts, or any other molded articles that can benefit from increased protection from UV degradation, corrosion, scratches, etc. For instance, the film can be resistant to corrosive effects of chlorine and employed on a lens or light cover for a light in a pool or spa.

Additionally or alternatively, the described films can have varied thickness from edge to center, which can provide focusing functionality (e.g., as a lens). In other embodiments, the film insert can be formed of a shape and thickness to act as a light collimator and/or diffuser.

Other features include tinting or shading the film to provide color filtering, which can reduce manufacturing costs. For instance, the article can be formed of a clear translucent material and the film can be provided in a variety of colors to facilitate manufacturing multiple color versions of the article without retooling the injection molding process with different colored viscous materials.

In another example, the film is employed when molding plastic or polymer-based components for appliances, tools, toys, etc., that may be exposed to excessive UV light outdoors or through a window, or for which scratch resistance is desired.

The exemplary embodiment has been described with reference to the various aspects. Obviously, modifications and alterations will occur to others upon reading and understanding the preceding detailed description. It is intended that the embodiments be construed as including all such modifications and alterations insofar as they come within the scope of the appended claims or the equivalents thereof.

The invention claimed is:

1. A film insert molding (FIM) system, comprising
   a film insert configured to protect an article;
   a parabolic 3-D shaped mold having side portions and a shape of the article to be protected, with a ratio of radius of curvature to diameter that is between approximately 1.5:1 and 10:1 to prevent wrinkling of the film insert, into which the film is placed; and
   an injection molding component that injects viscous material into the mold to form the article, to which the film adheres as the viscous material cools, said film-coated article having an increased hardness.

2. The system according to claim 1, wherein the film is a scratch resistant film.

3. The system according to claim 1, wherein the film is a UV resistant film.

4. The system according to claim 1, wherein the film is a corrosion resistant film.

5. The system according to claim 1, wherein the film is a reflective film.

6. The system according to claim 1, wherein the film is a heat resistant film.

7. The system according to claim 1, wherein the film has a curvature that complements a ellipsoid portion of the article to which the film is coupled.

8. The system according to claim 1, wherein the film is an opaque film having a pattern cut therein.

9. The system according to claim 8 wherein the pattern is arrow-shaped.

10. The system according to claim 9, wherein the article is a traffic light cover shell.

11. The system according to claim 1, wherein the article is a translucent cover shell for a traffic light.

12. The system according to claim 11, wherein the film increases hardness of the cover shell.

13. The system according to claim 11, wherein the film increases UV resistance of the cover shell.

14. The system according to claim 1, wherein the film acts as an optical lens when coupled to the article.

15. The system according to claim 1, wherein the film acts as an optical diffuser when coupled to the article.

16. A film insert molding (FIM) system, comprising
a flexible planar film having a shape that is congruent to a surface of an translucent traffic light shell; and
a mold having a shape of the traffic light shell, into which the film is placed and viscous material is injected to form the traffic light shell, to which the film adheres as the viscous material cools;
wherein the surface of the mold has a ratio of a radius of curvature to diameter of an interior surface of the mold that is between approximately 1.5:1 and 10:1 to prevent wrinkling of the film;
wherein the film is configured to protect said traffic light shell from ultraviolet light and increase shell surface hardness.

* * * * *